D. H. WILSON.
STORAGE BATTERY.
APPLICATION FILED SEPT. 23, 1913. RENEWED FEB. 3, 1917.
1,240,280.
Patented Sept. 18, 1917.
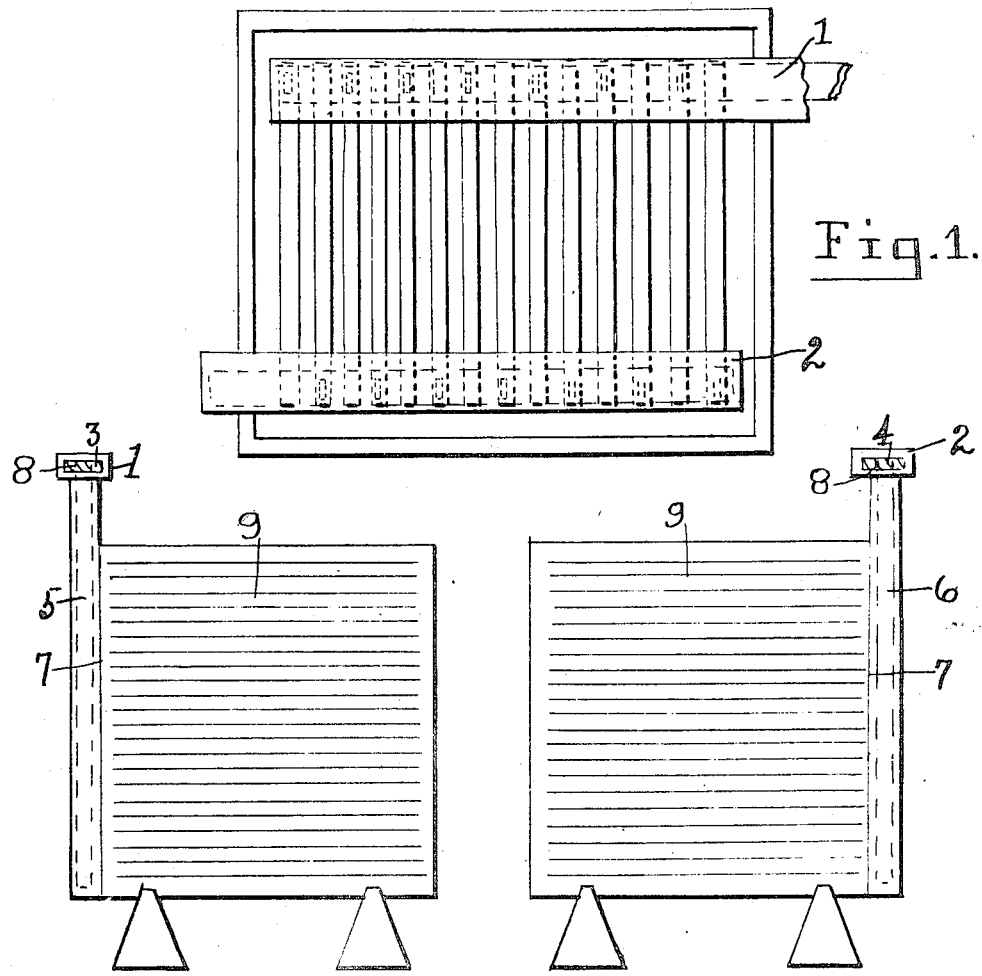
WITNESSES
INVENTOR
David H. Wilson
Myron F. Hill
Att'y

UNITED STATES PATENT OFFICE.

DAVID H. WILSON, OF PATERSON, NEW JERSEY.

STORAGE BATTERY.

1,240,280.

Specification of Letters Patent.

Patented Sept. 18, 1917.

Application filed September 23, 1913, Serial No. 791,418. Renewed February 3, 1917. Serial No. 146,519.

*To all whom it may concern:*

Be it known that I, DAVID H. WILSON, a citizen of the United States, residing at Paterson, Bergen county, New Jersey, have invented a new and useful Improvement in Storage Batteries, of which the following is a specification, reference being made to the accompanying drawings.

The object of my invention is a better distribution of a current of heavy amperage over the surfaces of a battery plate having low resistance leading in conductors.

In the drawings:

Figure 1 is a plan view of my battery.

Fig. 2 is a side elevation of a plate adapted to be connected to one terminal of a charging circuit.

Fig. 3 is a side elevation of the plates adapted to be connected to the other terminal of the charging circuit.

In Fig. 1 are shown two bus bars 1 and 2, having within them copper inserts 3 and 4 to which are directly connected copper inserts 5 and 6 in the battery plates respectively, as shown in Figs. 2 and 3, the inserts 5 being connected to the bus bar 1 and the inserts 6 being connected to the bus bar 2.

The inserts reach to the bottom of the plates, or close to the bottom as shown in the side elevations. They are so intimately joined to the plates and the plates, or those portions of them covering the copper are so dense that there is no possibility of electrolytic action likely to destroy the construction. This is attained by running the copper strip through a bath of hot plastic lead subjected to hydraulic or other heavy pressure, and causing it to issue through an aperture larger than the strip, the lead solidifying as it issues with the copper through the aperture. The strip thus covered is attached to the plate along the line 7 in either plate.

The upper end of the copper insert is bared and inserted in the copper in the bus bar as indicated in broken lines at 8. The joint may be soldered or brazed, and then covered with burned lead.

The bus bars may have any suitable construction for connection with the charging circuit.

Batteries thus constructed are capable of receiving a heavy amperage of current,— many times the amount that the ordinary lead plate can receive without injury. The location of the inserts provides paths from one plate to the other of substantially equal resistance since the current passes from all parts of the plate inserts to the lead in substantially equal proportions, and since the resistance from an insert in a plate of one polarity to an insert in a plate of the opposite polarity laterally is equal at all levels of the battery.

The distribution of the current equally to all portions of the plate surfaces causes equal growth over the plate surfaces by reducing and substantially eliminating warping strains which buckle the plates.

The plates may have their surfaces ribbed as shown at 9 to increase the plate surface.

While I have described copper as being the material of which the inserts are composed, I would not be understood as limiting my invention to that material. Any low resistance material which unites with lead or other plate material will answer.

What I claim is:

1. In a storage battery, battery plates of high resistance non-porous material, low resistance inserts therein located at opposite sides of the plates of opposing polarity to equalize the resistance of the paths of the currrent between them.

2. In a battery, battery plates composed of high non-porous resistance and low resistance portions, the low resistance portions being located at opposite margins of the plates of opposite polarity to equalize the resistance of the paths of current between them.

3. In a storage battery, opposite polarity bus bars carrying low resistance conductors, battery plates connected thereto containing low resistance conductors along the opposite margins of the plates of opposite polarity, said low resistance conductors in the plates being directly connected to the low resistance portions of the bus bars.

Signed at New York, in the city, county and State of New York this 17th day of February, 1913.

DAVID H. WILSON.

Witnesses:
 MYRON F. HILL,
 A. L. TRAVIS.